United States Patent [19]

Halsor et al.

[11] 3,896,309

[45] July 22, 1975

[54] RADIATION DETECTING DEVICE

[75] Inventors: Jack L. Halsor, Baltimore; Pieter Dewit, Ferndale; Edgar L. Irwin, Glen Burnie, all of Md.

[73] Assignee: Westinghouse Electric Corporation, Pittsburgh, Pa.

[22] Filed: May 21, 1973

[21] Appl. No.: 362,138

[52] U.S. Cl. .......... 250/211 J; 317/235 B; 317/248; 250/370

[51] Int. Cl. .......... H01l 15/00

[58] Field of Search .......... 250/370, 371, 211 J, 238; 317/235 B, 235 H, 235 N, 235 Y, 248

[56] References Cited

UNITED STATES PATENTS

| | | | |
|---|---|---|---|
| 2,735,934 | 2/1956 | Keizer et al. | 317/248 X |
| 3,188,539 | 6/1965 | Oxley | 317/248 |
| 3,413,497 | 11/1968 | Atalla | 317/235 B |
| 3,553,540 | 1/1971 | Puterbaugh, Jr. | 317/235 H |

*Primary Examiner*—Walter Stolwein
*Attorney, Agent, or Firm*—J. B. Hinson

[57] ABSTRACT

A multiwavelength radiation detector having the ability to integrate received radiation. The detector comprises a modified MOS field effect transistor wherein the gate takes the form of a cantilevered member formed from two layers of material of differing coefficients of expansion, one above the other. The free end of the cantilevered member extends over the space between the source and drain regions of the field effect transistor. As radiation impinges upon the cantilevered member, it will bend, causing the distance between the gate and the underlying semiconductive substrate to vary. In this manner, and assuming a constant gate voltage, the surface conductivity of the substrate between the source and drain regions can be made to vary as function of the integrated value of radiation which has impinged on the cantilevered member over a selected time interval. Such detectors can be connected in arrays, such that a radiation pattern over an area can be determined.

6 Claims, 5 Drawing Figures

RADIATION DETECTING DEVICE

BACKGROUND OF THE INVENTION

For many sensing applications beyond the visible radiation spectrum, multiwavelength detectors are required; and in many cases large arrays of such detectors are required. The ability to integrate received energy is a necessary element to maintain sensitivity and insure detection of brief events occurring between periodic interrogations by scanning readout electronics. While many different types of radiation detectors have been devised which are operable beyond the visible radiation spectrum, many require the use of a glass envelope, are bulky, or are otherwise unsatisfactory.

SUMMARY OF THE INVENTION

In accordance with the present invention, a novel radiation detector is provided comprising a modified MOS field effect transistor wherein the gate takes the form of a cantilevered member formed from two layers of material of differing coefficients of expansion, one above the other. The two layers of material may be formed from metals or one may be formed from metal while the other is formed from a nonmetallic substance such as glass. In any event, the two materials must have different coefficients of expansion such that, upon exposure to radiation and resultant heating, the cantilevered member will bend either upwardly or downwardly. Assuming a constant bias voltage between the cantilevered gate and an underlying semiconductive substrate, this bending effect will vary the surface conductivity characteristics of the bulk semiconductive substrate between the source and drain regions. Thus, as radiation impinges upon the cantilevered member, the conducting channel between the source and drain regions will be either enhanced or depleted, whereby the variation in current between the source and drain regions will be an indication of the amount of radiation which has impinged upon the cantilevered gate.

Specifically, there is provided in accordance with the invention a substrate of semiconductive material of one type conductivity having spaced source and drain regions of the other type conductivity formed in a surface thereof. An oxide layer covers at least selected portions of the surface of the substrate; while a cantilevered member is secured to the oxide layer at an area removed from the spaced regions and has a free end extending over the area of the substrate between the spaced source and drain regions.

The cantilevered member comprises the gate of a field effect transistor and is formed from at least two layers of different materials one above the other, the different materials having different coefficients of expansion with at least one of the materials preferably being electrically conductive. The arrangement is such that upon exposure to radiation and resultant heating of the cantilevered member, it will bend due to the different coefficients of expansion of the materials from which it is formed and vary the spacing between the cantilevered member and the substrate. In this manner, and again assuming that a constant gate voltage is applied between the cantilevered member and the substrate, the surface conductivity characteristics of the substrate between the spaced source and drain regions can be made to vary as a function of the amount of radiation absorbed by the cantilevered member. As was mentioned above, such individual devices can be connected in arrays such that a radiation pattern can be detected.

The above and other objects and features of the invention will become apparent from the following detailed description taken in connection with the accompanying drawings which form a part of this specification and in which.

Figure 1:
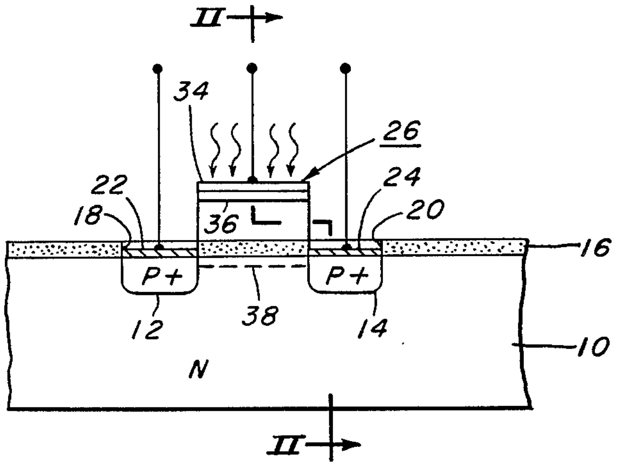
FIG. 1 is a cross-sectional view of the radiation detector of the invention, viewing the cantilevered gate element from its forward end.
Figure 2:
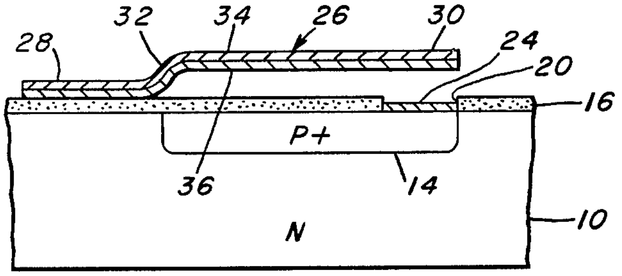
FIG. 2 is a cross-sectional view of the device of FIG. 1 taken substantially along line II—II of FIG. 1.

With reference now to the drawings, and particularly to FIGS. 1 and 2, the device shown comprises a substrate of N-type silicon 10 having diffused into its upper surface spaced P+ regions 12 and 14. It will be understood, of course, that instead of using an N-type substrate, a P-type substrate can be used, in which case the diffused regions would be of N+ conductivity. Covering the upper surface of the substrate 10 is an oxide layer 16 having windows 18 and 20 etched therein so as to expose the P+ regions 12 and 14. The regions 12 and 14, in turn, are covered with source and drain metallizations or electrodes 22 and 24 in accordance with usual procedure.

Secured to the oxide layer 16 at a point removed from the source and drain regions (FIG. 2) is a cantilevered gate element or electrode 26. The cantilevered element 26 comprises a first portion 28 secured to the oxide layer 16 and a second, free end portion 30 which extends outwardly above the oxide layer and over the space between the source and drain regions 12 and 14. The two portions 28 and 30 are joined by means of a bent portion 32 such that the free end portion 30 may flex upwardly or downwardly over the space between the source and drain regions 12 and 14. The manner in which the cantilevered member 26 is formed such that portion 30 is spaced above the oxide layer 16 will hereinafter be described.

As best shown in FIG. 2, the cantilevered element 26 is formed in two layers 34 and 36. It is essential that these two materials have different coefficients of expansion such that upon exposure to radiation and resultant heating, the free end portion 30 will flex downwardly or upwardly. For example, if the upper layer 34 has a greater coefficient of expansion than the lower layer 36, then resultant heating upon exposure to radiation will cause the free end portion 30 to bend or deflect downwardly toward the oxide layer 16. On the other hand, if the lower layer 36 has a greater coefficient of expansion, then the free end portion 30 will flex upwardly in response to heating as a result of exposure to radiation. The two layers 34 and 36 may be formed from dissimilar metals. Alternatively, one layer, such as the upper layer 34, can be formed from a metal such as gold while the lower layer 36 is formed from a glass. In certain cases, it may be possible to have both layers formed from dielectric materials, but in this latter case it will be necessary to deposit, by evaporation techniques or otherwise, an additional metal electrode over the upper layer 34.

It will be appreciated that the structure thus far described is somewhat similar to an isolated gate field effect transistor, except that the gate electrode, comprising the cantilevered element 26, is spaced above the oxide layer 16 and will be deflected downwardly or upwardly in response to radiation and resultant heating. The device may be interrogated by pulsing the gate electrode or cantilevered element 26 such that an inversion layer 38 (FIG. 1), in this case a P-channel, will be enhanced or depleted between the source and drain regions 12 and 14. That is, assuming that the cantilevered gate electrode 26 is biased negative with respect to the substrate 10, the P-type channel 38 will be enhanced. On the other hand, if the polarity of the bias voltage is reversed, then the channel 38 will be depleted.

Assuming that the enhancement mode is employed, the current flowing between the source and drain will be inversely proportional to the distance between the cantilevered gate electrode 26 and the upper surface of the substrate 10. As is known, the characteristics of a MOS field effect transistor are greatly affected as its gate dielectric is altered. In this case, the gate dielectric is a passivating oxide layer 16 together with the variable separation between the cantilevered gate electrode 26 and substrate 10. Since the distance between the cantilevered gate 26 and the inversion layer or channel 38 is proportional to the flux density of radiation, the current flow between the drain and source is also proportional to the density of radiation.

The substrate 10, the drain and source regions 12 and 14, and the oxide layer 16 with windows 18 and 20 therein are fabricated utilizing standard integrated circuit technology. However, in order to form the cantilevered electrode 26, it is necessary to first deposit on the oxide layer 16 between the drain and source regions 12 and 14 a layer of material which can be subsequently etched away. For example, a layer of nickel can be deposited in the space between the source and drain regions. Following this, the first layer 36 of the cantilevered member 26 is deposited and then the second layer 34. Thereafter, the device can be placed, for example, in nitric acid which will etch away and remove the nickel but will not affect the materials from which the layers 34 and 36 are formed. It is a requirement, therefore, that in fabricating the device, the block or layer which forms the cantilever end portion 30 can be etched away without affecting the materials from which the cantilevered member itself is formed.

Figure 3:
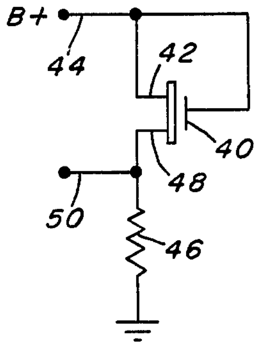
FIG. 3 illustrates one manner in which a gate bias may be applied to the device of FIGS. 1 and 2 and the manner in which a signal representative of integrated radiation can be derived from the device.
Figure 4:
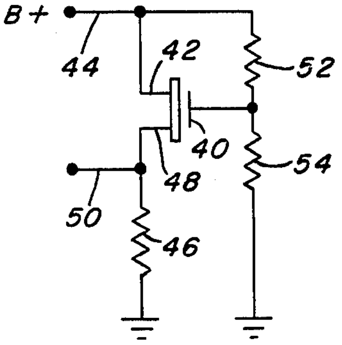
FIG. 4 is a schematic circuit diagram, similar to that of FIG. 3, showing an alternative arrangement for gate biasing.

FIGS. 3 and 4 illustrate two methods for biasing the radiation detector of FIGS. 1 and 2. In FIG. 3 the gate electrode 40 is tied to the drain electrode 42. A source of B+ voltage is applied to both the gate and drain via terminal 44 and can be adjusted, for example, just above the threshold voltage. The maximum change in bias current due to incident radiation will occur at this point. Readout is across a resistor 46 connected between the source electrode 48 and ground, the actual signal appearing on terminal 50. This signal, as will be appreciated, is proportional to the current flowing between the source and drain and varies as a function of the amount of incident radiation on the cantilevered gate electrode 26.

For applications where an exact threshold voltage cannot be supplied, the arrangement of FIG. 4 can be used. Elements in FIG. 4 which corresond to those of FIG. 3 are identified by like reference numerals. In this case, however, a voltage divider comprised of resistors 52 and 54 is connected between the B+ voltage source and ground, the junction of resistors 52 and 54 being connected to the gate electrode 40.

The greatest potential of the radiation detector of the invention is realized in an array of such detectors. It is uniquely qualified for this application because of its innate mechanism for integrating incident radiation. That is, the amount of heat in the cantilevered gate 26 and its degree of deflection upwardly or downwardly is a function of the integrated radiation to which it has been exposed. Furthermore, since the cantilevered gate 26, comprising the sensor element, is attached to the substrate at only one point, it is somewhat thermally isolated. Thus, it has the ability to store heat for short periods of time. The storage time is the frame rate of the sensor array; and once during each frame time, each element can be interrogated.

One type of single-line or linear array is shown in FIG. 3 wherein enhancement mode detectors are employed. A common drain conductor 56 is connected to each of the drains of a plurality of detectors 58 and is also connected to a B+ voltage supply via terminal 60. Similarly, the source electrodes are connected to a common conductor 62 connected through load resistor 64 to ground. Output signals, therefore, appear at terminal 66. Each of the cantilevered gate electrodes of the detectors 58 in the array are connected to an associated output of a shift register 68 driven by clock 70. In this manner, it will be appreciated that the gate electrodes are pulsed by the shift register in sequence, such that a series of pulses or signals will appear across load resistor 64, each of these pulsed signals having a magnitude proportional to the radiation to which an associated one of the detectors 58 has been exposed.

Figure 5:
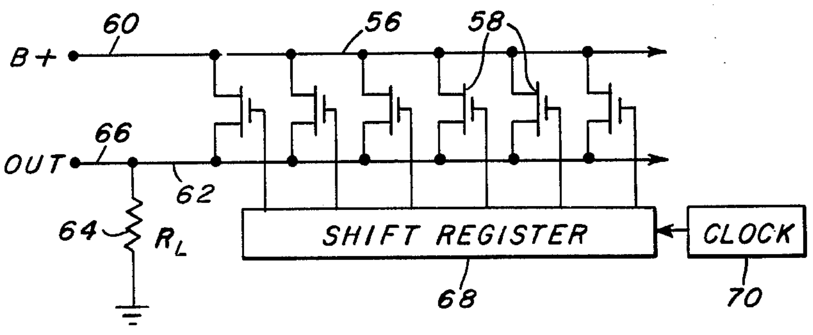
FIG. 5 is a schematic circuit diagram illustrating one manner in which the radiation detectors of the invention can be connected in a linear array.

Sequential switching by driving the gates of the sensors in this manner has two main advantages. First, it allows high speed interrogation because only the low capacitance of the gate need be driven. Secondly, the low input capacitance of the gates permits the use of low power shift registers. It will, of course, be appreciated that the system of FIG. 5 can be extended to a two-dimensional array comprised of a plurality of linear arrays. In this case, the outputs of the shift registers will be connected to a gate electrode of an associated one of each of the detectors in an array, and the final output from the shift register used to drive a second shift register which sequentially connects the drain electrodes of the lines in the array to a B+ voltage source. The arrangement, of course, would be similar to a readout system for an array of photodiodes.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. A radiation detecting device for integrating incident radiation comprising a substrate of semiconductive material of one type conductivity, spaced regions of the other type conductivity formed in a surface of said substrate, an oxide layer covering at least selected portions of said surface of the substrate, a cantilevered member secured to said oxide layer at an area removed from said spaced regions and having a free end extending over the area of said substrate between said spaced regions, said cantilevered member being formed from at least two layers of different materials one above the other, the different materials having different coefficients of expansion, source and drain electrodes connected to said spaced regions, and a gate electrode connected to said cantilevered member, the arrangement being such that upon exposure to radiation and resulting heating of the cantilevered member, it will bend due to the different coefficients of expansion of said materials and vary the spacing between said cantilevered member and the substrate, whereby the surface conductivity characteristics of the substrate between the spaced regions can be made to vary as a function of the amount of radiation absorbed by the cantilevered member.

2. The device of claim 1 wherein said spaced regions form the drain and source of an isolated gate field effect transistor and said cantilevered member comprises the gate of said field effect transistor.

3. The device of claim 2 wherein one of said materials from which the cantilevered member is formed is metallic while the other material is a dielectric, the metallic material forming said gate electrode.

4. The device of claim 3 wherein one of said materials from which the cantilevered member is formed comprises gold while the other material comprises glass.

5. The device of claim 1 wherein the materials from which the cantilevered member is formed are both metallic.

6. The device of claim 1 wherein said free end of the cantilevered member is raised above said oxide layer and is connected through a bent portion to the other end of the member which is secured to said oxide layer.

* * * * *